United States Patent
Higa et al.

(10) Patent No.: US 10,914,255 B2
(45) Date of Patent: Feb. 9, 2021

(54) VEHICLE, CONTROL DEVICE FOR VEHICLE, AND CONTROL METHOD FOR VEHICLE

(71) Applicant: TOYOTA JIDOSHA KABUSHIKI KAISHA, Toyota (JP)

(72) Inventors: Mitsuaki Higa, Toyota (JP); Shinichi Sugai, Toyota (JP); Daisuke Itoyama, Toyota (JP); Tsubasa Migita, Toyota (JP); Mitsuyori Matsumura, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 15/933,713

(22) Filed: Mar. 23, 2018

(65) Prior Publication Data

US 2018/0283301 A1 Oct. 4, 2018

(30) Foreign Application Priority Data

Mar. 29, 2017 (JP) .................................. 2017-064704

(51) Int. Cl.
*F02D 41/02* (2006.01)
*B60W 30/182* (2020.01)
(Continued)

(52) U.S. Cl.
CPC ........... *F02D 41/024* (2013.01); *B60W 10/06* (2013.01); *B60W 10/08* (2013.01); *B60W 10/30* (2013.01);
(Continued)

(58) Field of Classification Search
CPC .. B60W 30/182; B60W 50/082; B60W 50/14; B60W 10/06; B60W 10/08;
(Continued)

(56) References Cited

U.S. PATENT DOCUMENTS

2010/0242443 A1 9/2010 Kodama et al.
2013/0255236 A1 10/2013 Ishii et al.
(Continued)

FOREIGN PATENT DOCUMENTS

CN 101896699 A 11/2010
CN 105443197 A 3/2016
(Continued)

*Primary Examiner* — Anthony Ayala Delgado
(74) *Attorney, Agent, or Firm* — Sughrue Mion, PLLC

(57) ABSTRACT

A vehicle includes an engine having a particulate matter removal filter to remove particulate matter, in an exhaust system, and a control device to control the engine such that the vehicle travels in a mode selected from a plurality of modes including a first mode in which both fuel efficiency and ride quality are achieved and a second mode in which the engine is operated at a load higher than a predetermined load. When an accumulation quantity of the particulate matter in the particulate matter removal filter is equal to or more than a threshold, the control device notifies a driver that traveling in the second mode is recommended. When the driver selects the second mode in response to the notification, it is possible to restrain an uncomfortable feeling to be given to the driver, even if the engine is operated at a high load for regenerating the filter.

9 Claims, 3 Drawing Sheets

(51) Int. Cl.
| | |
|---|---|
| *B60W 10/08* | (2006.01) |
| *B60W 10/06* | (2006.01) |
| *B60W 10/30* | (2006.01) |
| *B60W 50/14* | (2020.01) |
| *B60W 20/16* | (2016.01) |
| *B60W 50/08* | (2020.01) |
| *F02D 41/22* | (2006.01) |

(52) U.S. Cl.
CPC .......... *B60W 20/16* (2016.01); *B60W 30/182* (2013.01); *B60W 50/082* (2013.01); *B60W 50/14* (2013.01); *F02D 41/029* (2013.01); *F02D 41/22* (2013.01); *B60W 2050/146* (2013.01); *B60W 2530/12* (2013.01); *B60Y 2300/476* (2013.01); *F02D 2041/026* (2013.01); *F02D 2041/228* (2013.01); *F02D 2200/0812* (2013.01); *Y02T 10/62* (2013.01); *Y02T 10/84* (2013.01)

(58) Field of Classification Search
CPC .......... B60W 10/30; B60W 2050/146; B60W 20/16; B60W 2530/12; B60Y 2300/476; F02D 2041/026; F02D 2041/228; F02D 2200/0812; F02D 41/024; F02D 41/029; F02D 41/22; Y02T 10/6286; Y02T 10/84
See application file for complete search history.

(56) References Cited

U.S. PATENT DOCUMENTS

| | | | | |
|---|---|---|---|---|
| 2015/0233277 | A1* | 8/2015 | Swoish | F01N 3/021 60/274 |
| 2015/0367736 | A1* | 12/2015 | Salomonsen | B60L 50/50 105/35 |
| 2016/0084184 | A1* | 3/2016 | Biagini | F02D 41/1446 60/605.1 |
| 2017/0096136 | A1 | 4/2017 | Nawata et al. | |

FOREIGN PATENT DOCUMENTS

| | | |
|---|---|---|
| JP | 2009-257264 A | 11/2009 |
| JP | 2013-227969 A | 11/2013 |
| JP | 2015-174627 A | 10/2015 |
| JP | 2015-202832 A | 11/2015 |
| JP | 2017-30745 A | 2/2017 |
| WO | 2015/159218 A2 | 10/2015 |

\* cited by examiner

VEHICLE, CONTROL DEVICE FOR VEHICLE, AND CONTROL METHOD FOR VEHICLE

INCORPORATION BY REFERENCE

The disclosure of Japanese Patent Application No. 2017-064704 filed on Mar. 29, 2017 including the specification, drawings and abstract is incorporated herein by reference in its entirety.

BACKGROUND

1. Technical Field

The disclosure relates to a vehicle, and specifically, relates to a vehicle including an engine having a particulate matter removal filter to remove particulate matter, in an exhaust system, a control device for the vehicle, and a control method for the vehicle.

2. Description of Related Art

As this kind of vehicle, conventionally, there has been proposed a vehicle that includes a filter to remove particulate matter (PM), in an exhaust system, and that secures engine operating time necessary for rise in the temperature of the filter, to quickly regenerate the filter (for example, Japanese Patent Application Publication No. 2015-202832). The vehicle includes an electric storage device that is charged when the engine operates. When the regeneration of the filter is requested, the vehicle expands the control range of the remaining capacity of the electric storage device, compared to when the regeneration of the filter is not requested, and increases the remaining capacity to an upper limit of the control range after decreasing the remaining capacity to a lower limit of the control range.

SUMMARY

The regeneration of the filter to remove the particulate matter is performed by burning accumulated particulate matter while supplying air to the filter by increasing air-fuel ratio or performing fuel cut in a state where the temperature of the filter is equal to or higher than a regenerative temperature. Accordingly, for raising the temperature of the filter to a temperature equal to or higher than the regenerative temperature, it is necessary to perform a high-load operation of the engine at a relatively high speed. The high-load operation of the engine for the regeneration of the filter does not give a very uncomfortable feeling to a driver who usually operates the engine at a relatively high load or a driver who sometimes operates the engine at a high load. However, the high-load operation of the engine for the regeneration of the filter gives an uncomfortable feeling to a driver who usually operates the engine only at a relatively low load, because of impairing a usual silence. In this case, when the silence is kept, the filter cannot be regenerated.

A vehicle in the disclosure regenerates a particulate matter removal filter, while restraining an uncomfortable feeling to be given to a driver.

For achieving a main object described above, the vehicle in the disclosure adopts the following means.

A first aspect of the disclosure is a vehicle. The vehicle includes: an engine including a particulate matter removal filter in an exhaust system, the particulate matter removal filter removing particulate matter; and an electronic control unit configured to control the engine such that the vehicle travels in a mode that is selected from a plurality of modes, the plurality of modes including a first mode and a second mode, the first mode being a mode in which the engine is operated at a predetermined load, the second mode being a mode in which the engine is operated at a load higher than the predetermined load. The electronic control unit is configured to notify a driver that traveling in the second mode is recommended, when an accumulation quantity of the particulate matter in the particulate matter removal filter is equal to or more than a threshold.

The vehicle travels in a mode that is selected from the plurality of modes including the first mode in which the engine is operated at the predetermined load and the second mode in which the engine is operated at the load higher than the predetermined load. When the accumulation quantity of the particulate matter in the particulate matter removal filter attached to the exhaust system of the engine is equal to or more than the threshold, the electronic control unit notifies the driver that traveling in the second mode is recommended. When the driver selects the second mode in response to the notification, the vehicle travels in the second mode in which the engine is operated at the load higher than the predetermined load. Therefore, even when the high-load operation of the engine is performed for the regeneration of the filter, it is possible to restrain the uncomfortable feeling to be given to the driver. Then, when the temperature of the particulate matter removal filter reaches a temperature equal to or higher than the regenerative temperature due to traveling in the second mode, air is supplied to the particulate matter removal filter by increasing air-fuel ratio or performing fuel cut, so that the particulate matter removal filter is regenerated. As a result, it is possible to regenerate the particulate matter removal filter, while restraining the uncomfortable feeling to be given to the driver. Here, the second mode may be a mode in which a commanded power with respect to a depression amount of an accelerator pedal is higher than in the first mode.

In the vehicle, the electronic control unit may be configured to notify the driver that traveling in the second mode is recommended, when the accumulation quantity of the particulate matter in the particulate matter removal filter is equal to or more than the threshold and an index reflecting an accumulation rate of the particulate matter in the particulate matter removal filter is equal to or more than a predetermined value. In the configuration, the notification is given only in an operation state where the accumulation rate of the particulate matter is high, and therefore, it is possible to restrain excessively frequent notifications. In the vehicle, the index may be one of an accumulation quantity of the particulate matter in the particulate matter removal filter per a predetermined period, an accumulation quantity of the particulate matter in the particulate matter removal filter per a predetermined traveling distance, a reciprocal of a period needed for a predetermined accumulation quantity of the particulate matter to accumulate in the particulate matter removal filter, and a reciprocal of a traveling distance needed for a predetermined accumulation quantity of the particulate matter to accumulate in the particulate matter removal filter. In the vehicle, the index may be the number of times that the accumulation quantity of the particulate matter in the particulate matter removal filter exceeds a predetermined accumulation quantity.

In the vehicle, for example, the notification that traveling in the second mode is recommended may be given through a display on a display device.

The vehicle may include: a motor that receives and outputs dynamic power for traveling; and an electric storage device that exchanges electric power with the motor. Fuel for the engine may be gasoline. That is, the vehicle may be a hybrid vehicle. In this case, the second mode may be a mode in which a stop of operation of the engine is prohibited.

The motor vehicle may include a deposition amount estimation apparatus. The electronic control unit may be configured to calculate the deposition amount using the deposition amount estimation apparatus.

A second aspect of the disclosure is a control device for a vehicle. The vehicle includes: an engine including a particulate matter removal filter in an exhaust system, the particulate matter removal filter removing particulate matter; and an electronic control unit configured to control the engine such that the vehicle travels in a mode that is selected from a plurality of modes, the plurality of modes including a first mode and a second mode, the first mode being a mode in which the engine is operated at a predetermined load, the second mode being a mode in which the engine is operated at a load higher than the predetermined load. The electronic control unit is configured to notify a driver that traveling in the second mode is recommended, when an accumulation quantity of the particulate matter in the particulate matter removal filter is equal to or more than a threshold.

A third aspect of the disclosure is a control method for a vehicle. The vehicle includes: an engine including a particulate matter removal filter in an exhaust system, the particulate matter removal filter removing particulate matter; and an electronic control unit configured to control the engine such that the vehicle travels in a mode that is selected from a plurality of modes, the plurality of modes including a first mode and a second mode, the first mode being a mode in which the engine is operated at a predetermined load, the second mode being a mode in which the engine is operated at a load higher than the predetermined load. The control method includes notifying, by the electronic control unit, a driver that traveling in the second mode is recommended, when an accumulation quantity of the particulate matter in the particulate matter removal filter is equal to or more than a threshold.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, modes for carrying out the disclosure will be described with use of embodiments.

Figure 1:
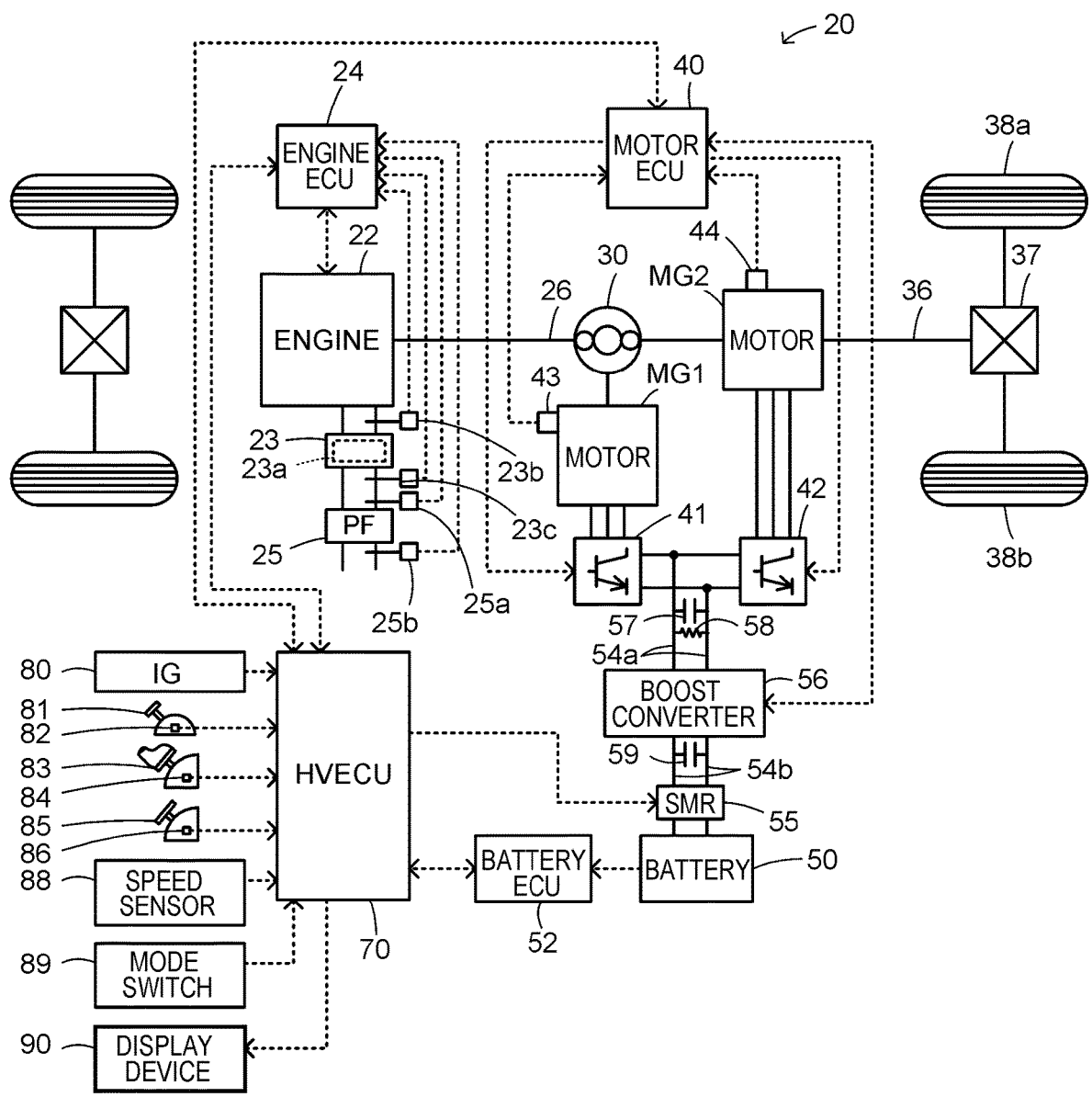
FIG. 1 is a configuration diagram showing a schematic configuration of a hybrid vehicle 20 in a first embodiment of the disclosure.

FIG. 1 is a configuration diagram showing a schematic configuration of a hybrid vehicle 20 in a first embodiment of the disclosure. As illustrated, the hybrid vehicle 20 in the embodiment includes an engine 22, an electronic control unit for the engine (hereinafter, referred to as an engine ECU) 24, a planetary gear 30, a motor MG1, a motor MG2, inverters 41, 42, an electronic control unit for the motors (hereinafter, referred to as a motor ECU) 40, a battery 50, an electronic control unit for the battery (hereinafter, referred to as a battery ECU) 52, a boost converter 56, and an electronic control unit for the hybrid vehicle (hereinafter, referred to as an HVECU) 70.

The engine 22 is configured as an internal combustion engine that outputs dynamic power using gasoline, light oil or the like as fuel. The operation of the engine 22 is controlled by the engine ECU 24. An exhaust gas control apparatus 23 and a particulate matter removal filter (hereinafter, referred to as a PM filter) 25 are attached to an exhaust system of the engine 22. The exhaust gas control apparatus 23 is filled with a catalyst 23a that removes unburned fuel and nitrogen oxides in exhaust gas. The PM filter 25, which is formed as a porous filter made of ceramic, stainless steel or the like, captures particulate matter (PM) such as soot. The PM filter 25 is called a gasoline particulate filter (GPF) when the engine 22 uses gasoline as fuel, and is called a diesel particulate filter (DPF) when the engine 22 uses light oil as fuel.

The engine ECU 24 is configured as a microprocessor constituted mainly by a CPU, which is not illustrated. In addition to the CPU, the engine ECU 24 includes a ROM in which processing programs are stored, a RAM in which data is temporarily stored, input and output ports, and a communication port. The engine ECU 24 receives signals from various sensors necessary to control the operation of the engine 22, through input ports. Examples of the signals from the various sensors include a crank position from an unillustrated crank position sensor that detects the rotational position of a crankshaft 26, and a coolant temperature Tw from an unillustrated water temperature sensor that detects the temperature of coolant for the engine 22. Further, examples of the signals from the various sensors include a throttle opening degree TH from an unillustrated throttle valve position sensor that detects the position of a throttle valve, an intake air quantity Qa from an unillustrated air flow meter that is attached to an intake pipe, an intake gas temperature Ta from an unillustrated temperature sensor that is attached to the intake pipe. Furthermore, examples of the signals from the various sensors include an air-fuel ratio AF from an air-fuel ratio sensor 23b that is attached upstream of the exhaust gas control apparatus 23 of the exhaust system, an oxygen signal O2 from an oxygen sensor 23c that is attached downstream of the exhaust gas control apparatus 23, and pressures P1, P2 from pressure sensors 25a, 25b that are respectively attached upstream and downstream of a PM filter 25. Further, the engine ECU 24 outputs various kinds of control signals for controlling the operation of the engine 22, through output ports. Examples of the various kinds of control signals include a drive signal to a fuel injection valve, a drive signal to a throttle motor that adjusts the position of the throttle valve, and a control signal to an ignition coil integrated with an igniter. The engine ECU 24 is connected with the HVECU 70 through the communication port. The engine ECU 24 controls the operation of the engine 22, in response to a control signal from the HVECU 70. The engine ECU 24, as necessary, outputs data about the operation state of the engine 22, to the HVECU 70. The engine ECU 24 computes a rotation speed of the crankshaft 26, that is, a speed Ne of the engine 22, based on a crank angle θcr. Further, the engine ECU 24 computes a volumetric efficiency (a ratio of the volume of air to be actually taken in one cycle of the engine 22 to the stroke volume in the one cycle) KL, based on the intake air quantity Qa from the air flow meter and the speed Ne of the engine 22. The engine ECU 24 computes a PM accumulation quantity Qpm as an estimated accumulation quantity of the particulate matter that is captured by the PM filter 25, based on a differential pressure $\Delta P$ ($\Delta P = P1 - P2$) between the pressures P1, P2 from the pressure sensors 25a, 25b, and computes a filter temperature Tf as an estimated temperature of the PM filter 25, based on the operation state of the engine 22.

The planetary gear 30 is configured as a single pinion type planetary gear mechanism. A sun gear, ring gear and carrier of the planetary gear 30 are respectively connected with a rotator of the motor MG1, a drive shaft 36 linked with drive wheels 38a, 38b through a differential gear 37, and the crankshaft 26 of the engine 22.

The motor MG1 is configured as a well-known synchronous generator-motor including a rotor in which a permanent magnet is buried and a stator around which a three-phase coil is wound, and the rotor is connected with the sun gear of the planetary gear 30, as described above. The motor MG2 is configured as a synchronous generator-motor, similarly to the motor MG1, and the rotor is connected with the drive shaft 36. The motor ECU 40 drives the motors MG1, MG2, by controlling the inverters 41, 42. The inverters 41, 42 are connected, through an electric power line (hereinafter, referred to as a drive voltage system electric power line) 54a, with the boost converter 56 connected with an electric power line (hereinafter, referred to as a battery voltage system electric power line) 54b that is connected with the battery 50 and a system main relay 55. Each of the inverters 41, 42 is configured as a well-known inverter including six transistors and six diodes, which are not illustrated. The boost converter 56 is configured as a well-known boost converter including two transistors, two diodes and a reactor, which are not illustrated.

The drive voltage system electric power line 54a is connected with a smoothing capacitor 57 for smoothing and a discharge resistor 58 for discharge, in parallel. The system main relay 55 is attached on the side of an output terminal of the battery 50 of the battery voltage system electric power line 54b, and further, a filter capacitor 59 for smoothing is connected with the side of the boost converter 56 of the battery voltage system electric power line 54b.

The motor ECU 40 is configured as a microprocessor constituted mainly by a CPU, which is not illustrated. In addition to the CPU, the motor ECU 40 includes a ROM in which processing programs are stored, a RAM in which data is temporarily stored, input and output ports, and a communication port. The motor ECU 40 receives signals necessary to drive and control the motors MG1, MG2, for example, rotational positions θm1, θm2 from rotational position detection sensors 43, 44 that detect the rotational positions of the rotors of the motors MG1, MG2, and phase currents that are applied to the motors MG1, MG2 and that are detected by unillustrated current sensors, through input ports. Further, the motor ECU 40 receives a voltage (a voltage of the drive voltage system electric power line 54a; hereinafter, referred to as a drive voltage system voltage) VH of the smoothing capacitor 57 from an unillustrated voltage sensor attached between terminals of the smoothing capacitor 57, and a voltage (a voltage of the battery voltage system electric power line 54b; hereinafter, referred to as a battery voltage system voltage) VL of the filter capacitor 59 from an unillustrated voltage sensor attached between terminals of the filter capacitor 59. The motor ECU 40 outputs control signals for driving the inverters 41, 42 and the boost converter 56, and the like, through output ports. The motor ECU 40 communicates with the HVECU 70. The motor ECU 40 drives and controls the motors MG1, MG2, in response to a control signal from the HVECU 70, and as necessary, outputs data about the operation state of the motors MG1, MG2, to the HVECU 70. The motor ECU 40 computes speeds Nm1, Nm2 of the motors MG1, MG2, based on the rotational positions θm1, θm2 of the rotors of the motors MG1, MG2 from the rotational position detection sensors 43, 44.

The battery 50 is configured as a lithium-ion secondary battery, for example, and exchanges electric power with the motors MG1, MG2 through the inverters 41, 42. The battery ECU 52 that manages the battery 50 is configured as a microprocessor constituted mainly by a CPU, which is not illustrated. In addition to the CPU, the battery ECU 52 includes a ROM in which processing programs are stored, a RAM in which data is temporarily stored, input and output ports, and a communication port. The battery ECU 52 receives, through input ports, signals necessary to manage the battery 50, for example, a battery voltage Vb from an unillustrated voltage sensor that is provided between terminals of the battery 50, a battery current Ib from an unillustrated current sensor that is attached to an electric power line connected with the output terminal of the battery 50, and a battery temperature Tb from an unillustrated temperature sensor that is attached to the battery 50. The battery ECU 52 communicates with the HVECU 70, and as necessary, sends data about the state of the battery 50, to the HVECU 70, by communication. For managing the battery 50, the battery ECU 52 computes a state-of-charge SOC that is a ratio of the capacity of dischargeable electric power of the battery 50 at that time to the full capacity, based on an integrated value of a charge-discharge current Ib detected by the current sensor, and computes input and output limits Win, Wout that are maximum permissible electric powers allowing the battery 50 to be charged and discharged, based on the computed state-of-charge SOC and the battery temperature Tb.

The HVECU 70 is configured as a microprocessor constituted mainly by a CPU, which is not illustrated. In addition to the CPU, the HVECU 70 includes a ROM in which processing programs are stored, a RAM in which data is temporarily stored, input and output ports, and a communication port. The HVECU 70 receives various signals necessary for drive control and the like, for example, an ignition signal from an ignition switch 80, a shift position SP from a shift position sensor 82 that detects an operation position of a shift lever 81, an accelerator operation amount Acc from an accelerator pedal position sensor 84 that detects a depression amount of an accelerator pedal 83, and a brake pedal position BP from a brake pedal position sensor 86 that detects a depression amount of a brake pedal 85. Further, the HVECU 70 receives a vehicle speed V from a speed sensor 88, a mode switch signal MSW from a mode switch 89 that is attached near a driver's seat, and the like, through input ports. The HVECU 70 outputs control signals such as a drive signal to a system main relay 55 and a display signal to a display device 90 that is attached to an instrumental panel in front of the driver's seat, through output ports. The HVECU 70, as described above, is connected with the engine ECU 24, the motor ECU 40, and the battery ECU 52, through the communication port, and exchanges a variety of control signals and a variety of data, with the engine ECU 24, the motor ECU 40 and the battery ECU 52.

The mode switch 89 switches, for example, among a normal mode in which the engine is operated at a predetermined load, an ecology mode in which fuel efficiency is prioritized even when ride quality is reduced to some extent, and a sport mode in which the driver can enjoy a powerful sport traveling, by toggle. In the ecology mode, a required torque Tr* with respect to the accelerator operation amount Acc that is detected by the accelerator pedal position sensor 84 is set to a value lower than in the normal mode, an intermittent stop of the engine 22 is increased, or the engine 22 is operated at the most efficient operation point even when vibration or slight noise is generated. In the sport mode, the engine 22 is operated at a relatively high load while the required torque Tr* with respect to the accelerator operation amount Acc that is detected by the accelerator pedal position sensor 84 is set to a value higher than in the normal mode, a stop of the operation of the engine 22 is prohibited, or the engine 22 is operated at a relatively high load while the lower limit speed of the engine 22 is set corresponding to the vehicle speed V.

The thus configured hybrid vehicle 20 in the embodiment travels in a hybrid traveling (HV traveling) mode or an electric traveling (EV traveling) mode. Here, the HV traveling mode is a mode in which the vehicle travels with the operation of the engine 22, and the EV traveling mode is a mode in which the vehicle travels without the operation of the engine 22.

At the time of traveling in the HV traveling mode, first, the HVECU 70 sets the required torque Tr* that is required for traveling (that needs to be output to the drive shaft 36), based on the accelerator operation amount Acc from the accelerator pedal position sensor 84 and the vehicle speed V from the speed sensor 88. Subsequently, the HVECU 70 calculates a requested-traveling required power Pdrv* that is required for traveling, by multiplying the set required torque Tr* by a speed Nr of the drive shaft 36. Here, as the speed Nr of the drive shaft 36, the speed Nm2 of the motor MG2 or a speed to be obtained by multiplying the vehicle speed V by a conversion factor can be used. Then, the HVECU 70 sets a required power Pe* that is required for the vehicle, by adding a charge-discharge required power Pb* of the battery 50 (the charge-discharge required power Pb* is a positive value when the battery 50 is charged) to the calculated requested-traveling required power Pdrv*. Here, the charge-discharge required power Pb* is set such that the absolute value of a difference ΔSOC between the state-of-charge SOC of the battery 50 and a target state-of-charge SOC* is reduced. Next, the HVECU 70 sets a target operation point (target speed Ne*, target torque Te*) of the engine 22 and torque commands Tm1*, Tm2* of the motors MG1, MG2, such that the required power Pe* is output from the engine 22 and the required torque Tr* is output to the drive shaft 36. The target operation point (target speed Ne*, target torque Te*) of the engine 22 is set by previously determining an optimum action line of the operation point (speed, torque) of the engine 22 that optimizes fuel efficiency in consideration of noise, vibration and the like, and evaluating an operation point (speed, torque) on the optimum action line that corresponds to the required power Pe*. The HVECU 70 sends the target operation point (target speed Ne*, target torque Te*) of the engine 22, to the engine ECU 24. The HVECU 70 sends the torque commands Tm1*, Tm2* of the motors MG1, MG2, to the motor ECU 40. The engine ECU 24 performs an intake air quantity control, a fuel injection control, an ignition control and the like for the engine 22, such that the engine 22 is operated based on the target operation point. The motor ECU 40 performs a switching control for each transistor of the boost converter 56 and the inverters 41, 42, such that the motors MG1, MG2 are driven at the torque commands Tm1*, Tm2*.

At the time of traveling in the EV traveling mode, first, the HVECU 70 sets the required torque Tr*, based on the accelerator operation amount Acc from the accelerator pedal position sensor 84 and the vehicle speed V from the speed sensor 88, and calculates the requested-traveling required power Pdrv* by multiplying the required torque Tr* by the speed Nr of the drive shaft 36. Subsequently, the HVECU 70 sets the torque command Tm1* of the motor MG1 to zero, and sets the torque command Tm2* of the motor MG2 such that the required torque Tr* (requested-driving required power Pdrv*) is output to the drive shaft 36. The HVECU 70 sends the torque commands Tm1*, Tm2* of the motors MG1, MG2, to the motor ECU 40. As described above, the motor ECU 40 controls the boost converter 56 and the inverters 41, 42.

Figure 2:
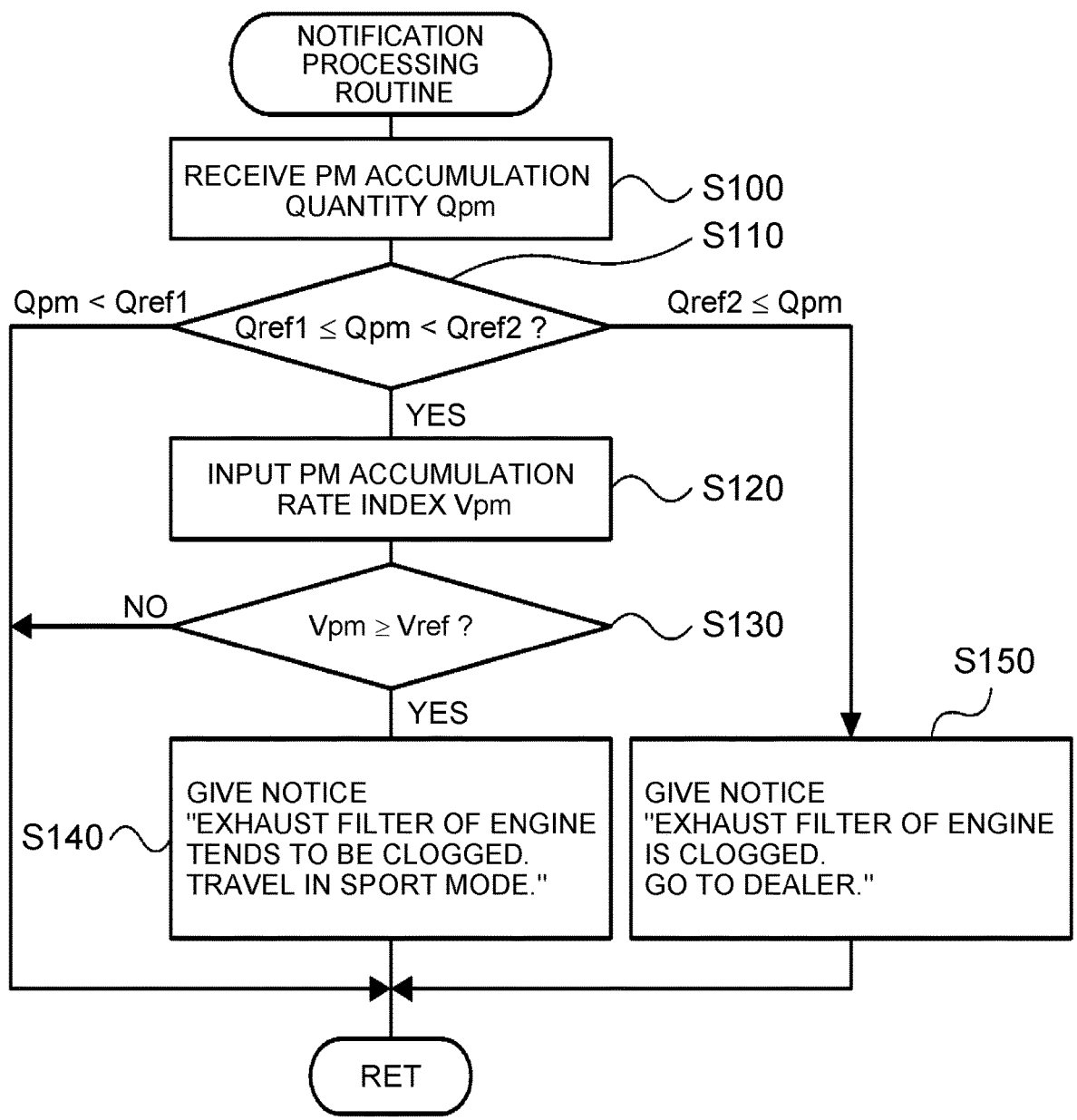
FIG. 2 is a flowchart showing an exemplary notification processing routine that is executed by an HVECU 70.

Next, an action of the thus configured hybrid vehicle 20 in the embodiment, particularly, an action when a PM accumulation quantity Qpm of the particulate matter accumulated in the PM filter 25 is equal to or more than a first threshold Qref1 will be described. The first threshold Qref1 can be previously set to a value at which it is determined that the PM filter 25 needs to be regenerated. FIG. 2 is a flowchart showing an exemplary notification processing routine that is executed by the HVECU 70. The routine is executed repeatedly at a predetermined time interval (for example, at an interval of several tens of milliseconds).

When the notification processing routine is executed, the HVECU 70, first, receives the PM accumulation quantity Qpm of the PM filter 25 (step S100). As the PM accumulation quantity Qpm of the PM filter 25, the PM accumulation quantity Qpm computed based on the differential pressure ΔP (ΔP=P1−P2) between the pressures P1, P2 from the pressure sensors 25a, 25b is input by communication from the engine ECU 24.

Subsequently, the HVECU 70 determines whether the input PM accumulation quantity Qpm is equal to or more than the first threshold Qref1 and whether the input PM accumulation quantity Qpm is equal to or more than a second threshold Qref2 (step S110). The second threshold Qref2 is a larger value than the first threshold Qref1, and can be previously set to a value at which it is determined that the PM filter 25 is clogged by the particulate matter. When the HVECU 70 determines that the PM accumulation quantity Qpm is less than the first threshold Qref1, the HVECU 70 determines that the PM filter 25 does not need to be regenerated, and ends the routine.

When the HVECU 70 determines that the PM accumulation quantity Qpm is equal to or more than the first threshold Qref1 and is less than the second threshold Qref2 in step S110, the HVECU 70 inputs an index Vpm of the accumulation rate of the PM accumulation quantity Qpm (step S120), and determines whether the accumulation rate index Vpm is equal to or more than a threshold Vref (step S130). Here, as the accumulation rate index Vpm, the accumulation quantity of the particulate matter in the PM filter 25 per a predetermined period (accumulation quantity/predetermined period), the accumulation quantity of the particulate matter in the PM filter 25 per a predetermined traveling distance (accumulation quantity/predetermined traveling distance), the reciprocal of a period needed for a predetermined accumulation quantity of the particulate matter to accumulate in the PM filter 25 (predetermined accumulation quantity/needed period), the reciprocal of a traveling distance needed for a predetermined accumulation quantity of the particulate matter to accumulate in the PM filter 25 (predetermined accumulation quantity/needed traveling distance), and the like can be used. Further, as the accumulation rate index Vpm, the number of times that the PM accumulation quantity Qpm of the particulate matter in the PM filter 25 exceeds a predetermined accumulation quantity can be used. As the predetermined accumulation quantity, for example, the first threshold Qref1 can be used.

When the HVECU 70 determines that the accumulation rate index Vpm of the PM accumulation quantity Qpm is less than the threshold Vref in step S130, the HVECU 70 determines that the notification to the driver is not necessary although the regeneration of the PM filter 25 will become necessary before too long, and ends the routine. On the other hand, when the HVECU 70 determines that the accumulation rate index Vpm of the PM accumulation quantity Qpm is equal to or more than the threshold Vref, the HVECU 70 displays, for example, a notice "Exhaust filter of engine tends to be clogged. Travel in sport mode.", on the display device 90 embedded in the instrumental panel in front of the driver's seat (step S140), and ends the routine. When the driver operates the mode switch 89 to the sport mode in response to the display, the stop of the operation of the engine 22 is prohibited, and the engine 22 is operated at a relatively high load. In the embodiment, in addition to the operation of the engine 22 at a relatively high load, a dither control of performing a control such that the increase and decrease in the air-fuel ratio of the engine 22 are repeated is executed, and the rise in the temperature Tf of the PM filter 25 is promoted. Then, when the filter temperature Tf reaches a temperature equal to or higher than a regenerative temperature (for example, 600° C.), air is supplied to the PM filter 25 by increasing air-fuel ratio or performing fuel cut, and the particulate matter accumulated in the PM filter 25 is burned, so that the PM filter 25 is regenerated. The driver knows that the PM filter 25 tends to be clogged, through the display on the display device 90, and the driver himself sets the sport mode. Thereby, even when the engine 22 is operated at a relatively high load for the regeneration of the PM filter 25, it is possible to regenerate the PM filter 25, while restraining an uncomfortable feeling from being given to the driver.

When the HVECU 70 determines that the PM accumulation quantity Qpm is equal to or more than the second threshold Qref2 in step S110, the HVECU 70 displays, for example, a notice "Exhaust filter of engine is clogged. Go to dealer.", on the display device 90 embedded in the instrumental panel in front of the driver's seat (step S150), and ends the routine. By this display, it is possible to inform the driver that the PM filter 25 is clogged.

In the above-described hybrid vehicle 20 in the embodiment, when the PM accumulation quantity Qpm of the PM filter 25 is equal to or more than the first threshold Qref1 and the accumulation rate index Vpm of the PM accumulation quantity Qpm is equal to or more than the threshold Vref, the notice "Exhaust filter of engine tends to be clogged. Travel in sport mode.", for example, is displayed on the display device 90 embedded in the instrumental panel in front of the driver's seat. When the driver operates the mode switch 89 to the sport mode in response to the display, the stop of the operation of the engine 22 is prohibited, and the engine 22 is operated at a relatively high load. Thereby, even when the engine 22 is operated at a high load for the regeneration of the PM filter 25, it is possible to restrain the uncomfortable feeling to be given to the driver. Then, when the temperature Tf of the PM filter 25 reaches a temperature equal to or higher than the regenerative temperature due to traveling in the sport mode, air is supplied to the PM filter 25 by increasing air-fuel ratio or performing fuel cut, and the PM filter 25 is regenerated. As a result, it is possible to regenerate the PM filter 25, while restraining the uncomfortable feeling to be given to the driver.

In the hybrid vehicle 20 in the embodiment, when the PM accumulation quantity Qpm of the PM filter 25 is equal to or more than the first threshold Qref1 and the accumulation rate index Vpm of the PM accumulation quantity Qpm is equal to or more than the threshold Vref, the notice "Exhaust filter of engine tends to be clogged. Travel in sport mode.", for example, is displayed on the display device 90. However, when the PM accumulation quantity Qpm of the PM filter 25 is equal to or more than the first threshold Qref1, the notice "Exhaust filter of engine tends to be clogged. Travel in sport mode.", for example, may be displayed on the display device 90 even if the accumulation rate index Vpm of the PM accumulation quantity Qpm is less than the threshold Vref.

In the hybrid vehicle 20 in the embodiment, when the PM accumulation quantity Qpm of the PM filter 25 is equal to or more than the second threshold Qref2, the notice "Exhaust filter of engine is clogged. Go to dealer.", for example, is displayed on the display device 90. However, such a display does not have to be performed.

In the hybrid vehicle 20 in the embodiment, for example, the notice "Exhaust filter of engine tends to be clogged. Travel in sport mode." or the notice "Exhaust filter of engine is clogged. Go to dealer." is displayed on the display device 90. However, the notices only need to be given to the driver. Therefore, the notices may be given to the driver by a method other than the display on the display device, and for example, the notices may be given to the driver by voice output.

Figure 3:
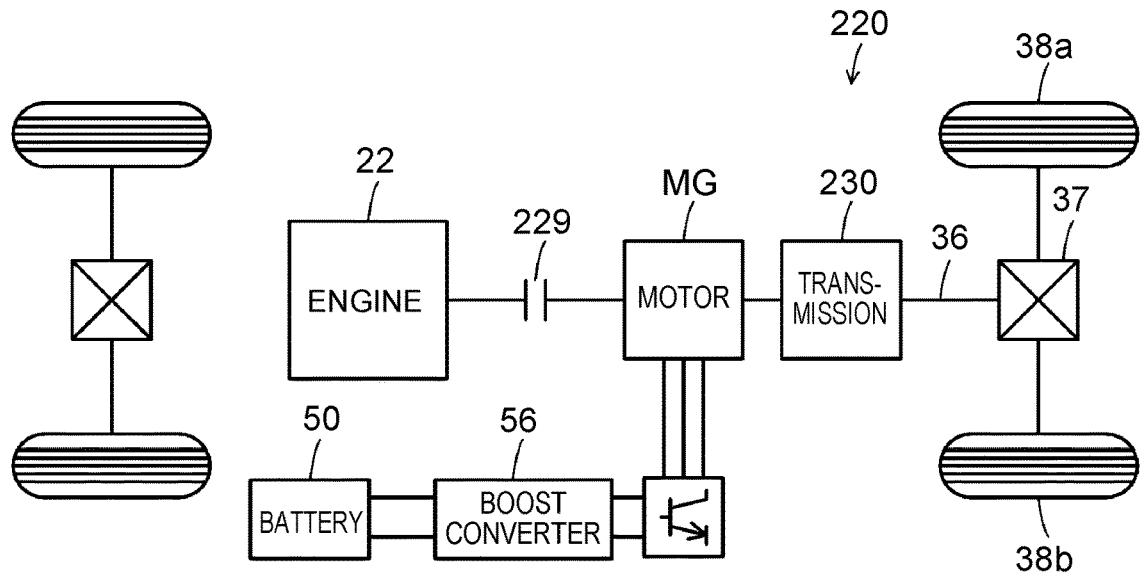
FIG. 3 is a configuration diagram showing a schematic configuration of a hybrid vehicle 220 in a modification.
Figure 4:
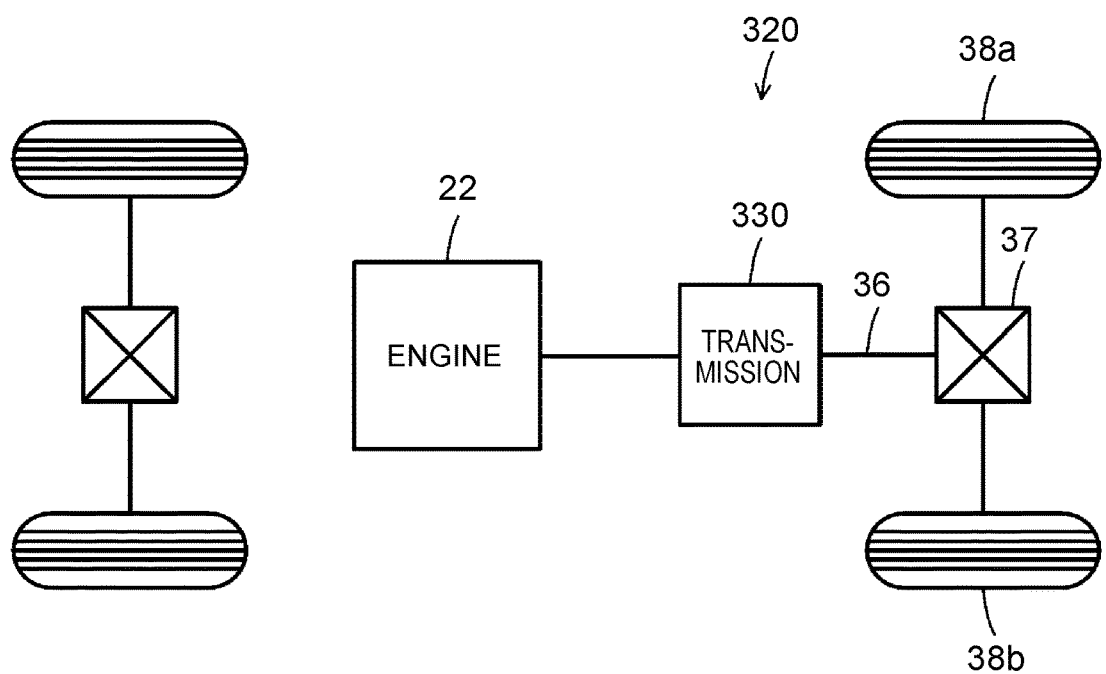
FIG. 4 is a configuration diagram showing a schematic configuration of a vehicle 320 in a modification.

In the hybrid vehicle 20 in the embodiment, the engine 22 and the two motors MG1, MG2 are connected with the planetary gear 30. However, it is only necessary to be a vehicle including the PM filter 25 in the exhaust system of the engine 22. Therefore, as in the case of a hybrid vehicle 220 exemplified in FIG. 3, a motor MG may be connected with the drive shaft 36 linked with the drive wheels 38a, 38b, through a transmission 230, and the engine 22 may be connected with the motor MG through a clutch 229. As in the case of a vehicle 320 exemplified in FIG. 4, the engine 22 may be connected with the drive shaft 36 linked with the drive wheels 38a, 38b, through a transmission 330.

The correspondence relation between main elements in the embodiment and main elements in the disclosure described in SUMMARY will be described. In the embodiment, the PM filter 25 is an example of the "particulate matter removal filter", the engine 22 is an example of the "engine", and the HVECU 70, the engine ECU 24, the motor ECU 40 and the battery ECU 52 are examples of the "electronic control unit". Further, the normal mode and the ecology mode are examples of the "first mode", and the sport mode is an example of the "second mode".

The correspondence relation between the main elements in the embodiment and the main elements in the disclosure described in SUMMARY does not limit elements of the disclosure described in SUMMARY, because the embodiment is an example for specifically describing modes for carrying out the disclosure described in SUMMARY That is, the disclosure described in SUMMARY should be interpreted based on the description in SUMMARY, and the embodiment is just a specific example of the disclosure described in SUMMARY.

Thus, modes for carrying out the disclosure have been described with use of embodiments. The disclosure is not limited to the embodiments, and naturally, can be carried out as a variety of modes, without departing from the spirit of the disclosure.

The disclosure can be utilized in the vehicle manufacturing industry and the like.

What is claimed is:

1. A vehicle comprising:
an engine including a particulate matter removal filter in an exhaust system, the particulate matter removal filter removing particulate matter; and
an electronic control unit configured to control the engine such that the vehicle travels in a mode that is selected from a plurality of modes, the plurality of modes including a first mode and a second mode, the first mode being a mode in which the engine is operated at a predetermined load, the second mode being a mode in which the engine is operated at a load higher than the predetermined load,
the electronic control unit being configured to notify a driver that traveling in the second mode is recommended, when an accumulation quantity of the particulate matter in the particulate matter removal filter is equal to or more than a threshold and an index reflecting an accumulation rate of the particulate matter in the particulate matter removal filter is equal to or more than a predetermined value, wherein
the index is the number of times that the accumulation quantity of the particulate matter in the particulate matter removal filter exceeds a predetermined accumulation quantity.

2. The vehicle according to claim 1, wherein
the second mode is a mode in which a commanded power with respect to a depression amount of an accelerator pedal is higher than in the first mode.

3. The vehicle according to claim 1, wherein
the index is one of the accumulation quantity of the particulate matter in the particulate matter removal filter per a predetermined period, the accumulation quantity of the particulate matter in the particulate matter removal filter per a predetermined traveling distance, a reciprocal of a period needed for a predetermined accumulation quantity of the particulate matter to accumulate in the particulate matter removal filter, and a reciprocal of a traveling distance needed for a predetermined accumulation quantity of the particulate matter to accumulate in the particulate matter removal filter.

4. The vehicle according to claim 1, wherein
the electronic control unit is configured to notify the driver through a display on a display device.

5. The vehicle according to claim 1, further comprising:
a motor that receives and outputs dynamic power for traveling; and an electric storage device that exchanges electric power with the motor,
wherein
fuel for the engine is gasoline.

6. The vehicle according to claim 5, wherein
the second mode is a mode in which a stop of operation of the engine is prohibited.

7. The motor vehicle according to claim 1, further comprising:
pressure sensors, wherein
the electronic control unit is configured to calculate the accumulation quantity using the pressure sensors.

8. A control device for a vehicle,
the vehicle including an engine including a particulate matter removal filter in an exhaust system, the particulate matter removal filter removing particulate matter,
the control device comprising an electronic control unit configured to control the engine such that the vehicle travels in a mode that is selected from a plurality of modes, the plurality of modes including a first mode and a second mode, the first mode being a mode in which the engine is operated at a predetermined load, the second mode being a mode in which the engine is operated at a load higher than the predetermined load,
the electronic control unit being configured to notify a driver that traveling in the second mode is recommended, when an accumulation quantity of the particulate matter in the particulate matter removal filter is equal to or more than a threshold and an index reflecting an accumulation rate of the particulate matter in the particulate matter removal filter is equal to or more than a predetermined value, wherein
the index is the number of times that the accumulation quantity of the particulate matter in the particulate matter removal filter exceeds a predetermined accumulation quantity.

9. A control method for a vehicle,
the vehicle including: an engine including a particulate matter removal filter in an exhaust system, the particulate matter removal filter removing particulate matter; and an electronic control unit configured to control the engine such that the vehicle travels in a mode that is selected from a plurality of modes, the plurality of modes including a first mode and a second mode, the first mode being a mode in which the engine is operated at a predetermined load, the second mode being a mode in which the engine is operated at a load higher than the predetermined load,
the control method comprising notifying, by the electronic control unit, a driver that traveling in the second mode is recommended, when an accumulation quantity of the particulate matter in the particulate matter removal filter is equal to or more than a threshold and an index reflecting an accumulation rate of the particulate matter in the particulate matter removal filter is equal to or more than a predetermined value, wherein
the index is the number of times that the accumulation quantity of the particulate matter in the particulate matter removal filter exceeds a predetermined accumulation quantity.

\* \* \* \* \*